United States Patent
Shibasaki

(10) Patent No.: US 7,554,972 B2
(45) Date of Patent: Jun. 30, 2009

(54) WIRELESS COMMUNICATION TERMINAL AND WIRELESS COMMUNICATION METHOD

(75) Inventor: Toshiyuki Shibasaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/533,247

(22) Filed: Sep. 19, 2006

(65) Prior Publication Data

US 2007/0070987 A1   Mar. 29, 2007

(30) Foreign Application Priority Data

Sep. 29, 2005   (JP)   ............................. 2005-285227

(51) Int. Cl.
*H04L 12/66* (2006.01)
*H04J 1/16* (2006.01)
*H04W 88/02* (2009.01)

(52) U.S. Cl. .................. 370/352; 370/235; 370/328
(58) Field of Classification Search ................ 370/235, 370/328, 338, 352, 428
See application file for complete search history.

(56) References Cited

U.S. PATENT DOCUMENTS

| | | | | |
|---|---|---|---|---|
| 5,950,130 | A * | 9/1999 | Coursey | 455/432.1 |
| 6,560,630 | B1 * | 5/2003 | Vepa et al. | 718/105 |
| 6,622,017 | B1 * | 9/2003 | Hoffman | 455/419 |
| 6,856,593 | B2 | 2/2005 | Nakajima | 370/218 |
| 2002/0025810 | A1 * | 2/2002 | Takayama et al. | 455/432 |
| 2003/0031154 | A1 * | 2/2003 | Kobayashi et al. | 370/338 |
| 2003/0179531 | A1 * | 9/2003 | Yamaguchi | 361/115 |
| 2005/0021999 | A1 * | 1/2005 | Touitou et al. | 713/200 |
| 2005/0114619 | A1 * | 5/2005 | Matsuo et al. | 711/170 |
| 2006/0029097 | A1 * | 2/2006 | McGee et al. | 370/468 |
| 2006/0034190 | A1 * | 2/2006 | McGee et al. | 370/254 |
| 2006/0089127 | A1 * | 4/2006 | Muratsu | 455/411 |
| 2007/0011226 | A1 * | 1/2007 | Hinni et al. | 709/203 |
| 2007/0230423 | A1 * | 10/2007 | Yoshida et al. | 370/338 |
| 2008/0056246 | A1 * | 3/2008 | McGee et al. | 370/389 |

FOREIGN PATENT DOCUMENTS

| | | |
|---|---|---|
| JP | 2000-148619 | 5/2000 |
| JP | 2001-308936 | 11/2001 |
| JP | 2001-339431 | 12/2001 |

* cited by examiner

*Primary Examiner*—Rasha S Al Aubaidi
(74) *Attorney, Agent, or Firm*—Hogan & Hartson LLP

(57) ABSTRACT

A wireless communication terminal has a function of performing data communication with a server connected to a network, and includes a communication controller which selects a predetermined port number from among a plurality of port numbers allocated for data communication with the server, and using this communication port number to perform data communication with the server, and a storage unit which stores the communication port number; while performing a process to establish a communication connection with the server, if the communication controller receives information indicating that communication connection is impossible from the server, it selects a port number which is different from the communication port number stored in the storage unit as a new communication port number, and performs the process again.

14 Claims, 2 Drawing Sheets

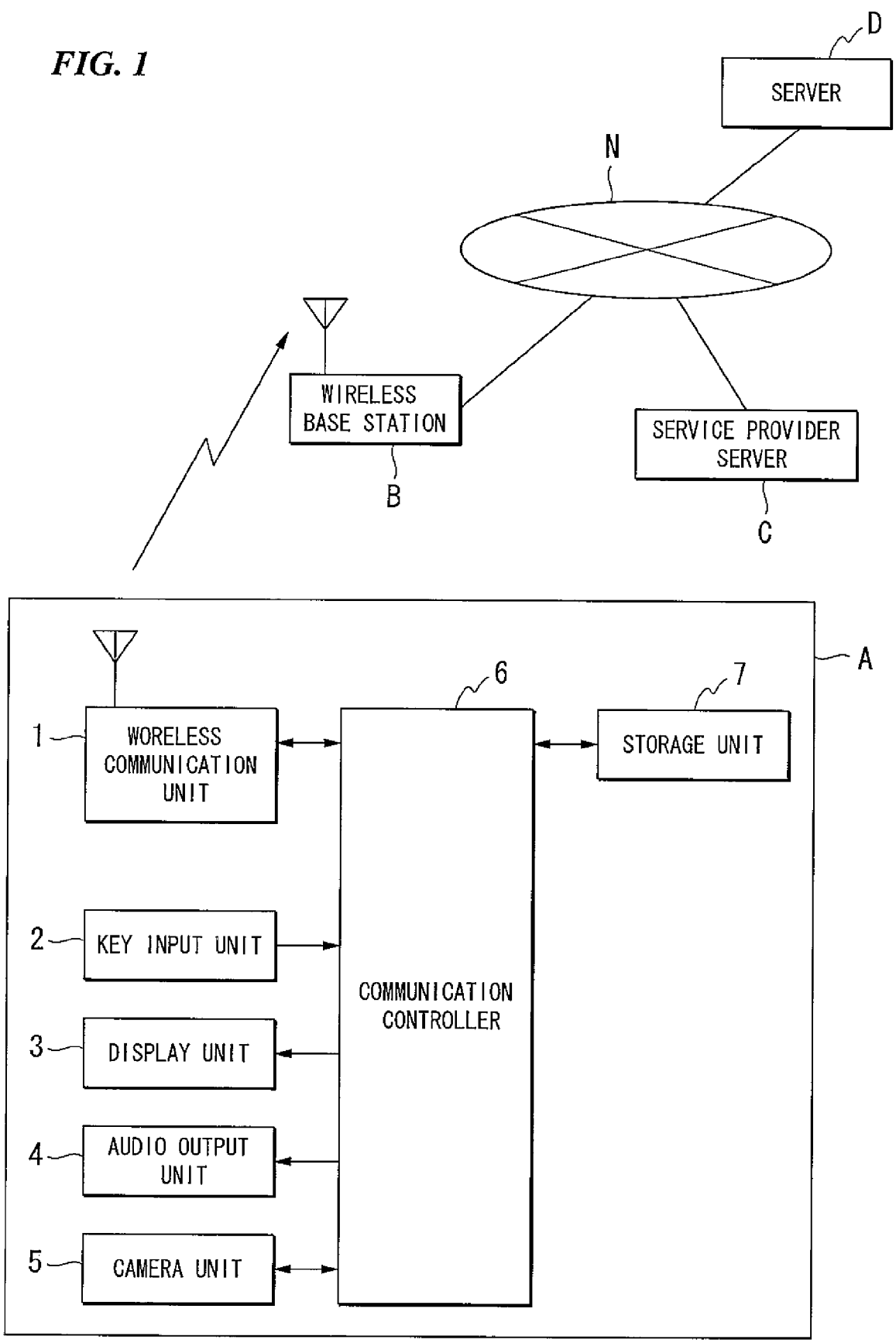

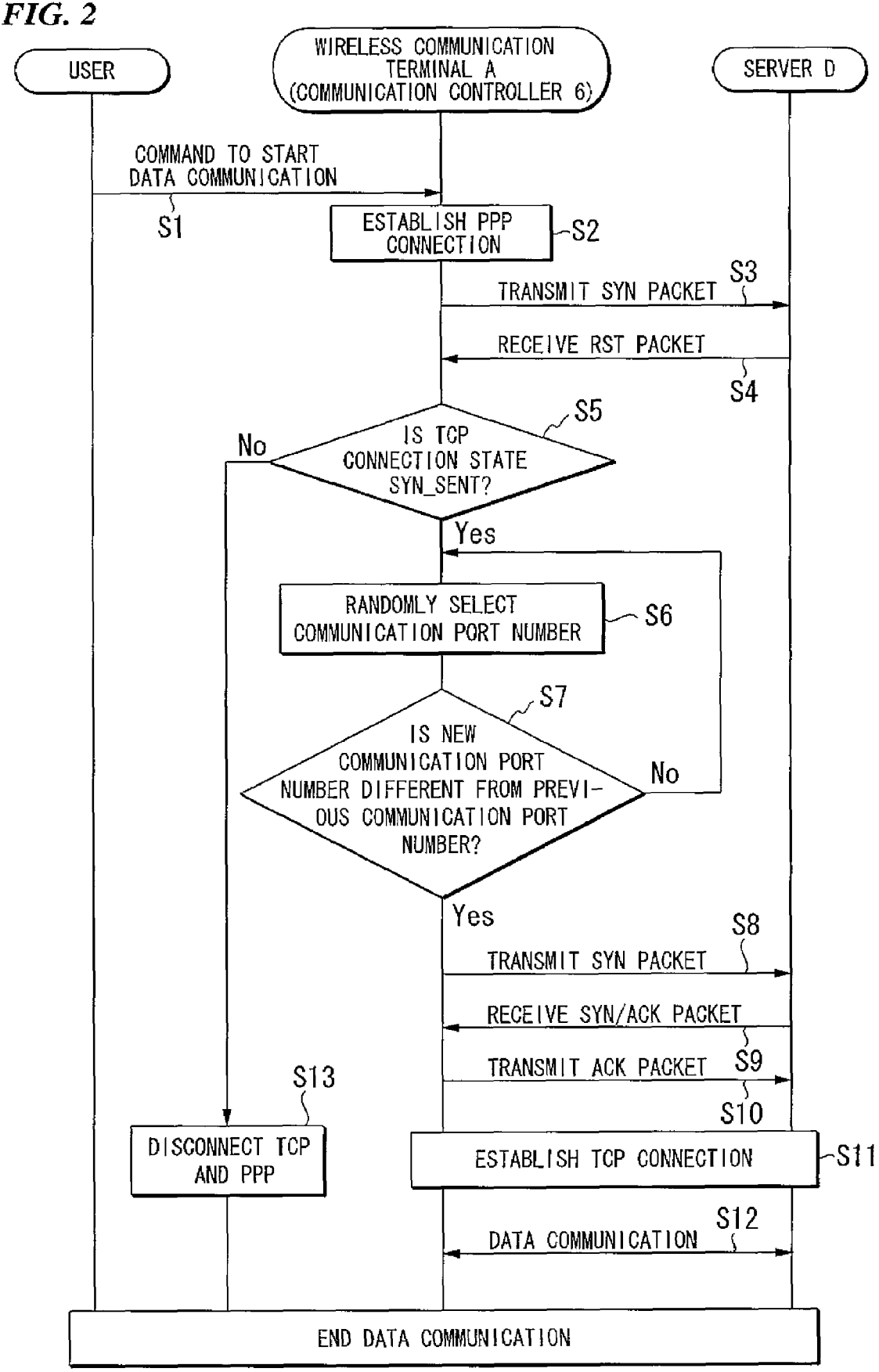

WIRELESS COMMUNICATION TERMINAL AND WIRELESS COMMUNICATION METHOD

BACKGROUND OF THE INVENTION

1. Field of the Invention

The present invention relates to a wireless communication terminal and a wireless communication method.

Priority is claimed on Japanese Patent Application No. 2005-285227, filed Sep. 29, 2005, the content of which is incorporated herein by reference.

2. Description of Related Art

A wireless communication terminal such as a mobile telephone including a function of communicating data with a server connected to a network generally establishes communication with the server by the following processing procedure. When the wireless communication terminal receives a command to start data communication with the server from a user (actually, when the user presses a special key for starting data communication on the wireless communication terminal), it starts a point to point protocol (PPP) connection process and obtains an internet protocol (IP) address from a service provider. After establishing the PPP connection, in order to establish a transmission control protocol (TCP) connection with the server, the wireless communication terminal selects a predetermined port number from among a plurality of port numbers for data communication allocated to it as a communication port number (i.e. it uses a socket which combines the IP address with the communication port number as its own network address) and transmits a synchronize (SYN) packet to the server. A predetermined socket for data communication is, of course, allocated to the server side.

The server receives the SYN packet and, if capable of communication connection, transmits a SYN/ACK (acknowledgment) packet to the wireless communication terminal. When the wireless communication terminal receives the SYN/ACK packet, it transmits an ACK packet to the server. This establishes a TCP connection between the wireless communication terminal and the server For example, numbers from 1024 to 65536 are determined as port numbers which can be used by a mobile telephone, and the mobile telephone establishes a communication connection with the server by setting an arbitrary communication port number within this range. The port number on the server side depends on the service protocol being used. For example, port number 80 is set for a hyper text transfer protocol (HTTP).

When the wireless communication terminal enters a non-communicable state during the above data communication and the user inputs a command to end data communication, the wireless communication terminal shifts to a TCP disconnection state. However, since the wireless communication terminal is in a non-communicable state, the TCP disconnection message it generates does not reach the server, and the TCP connection established on the server side continues. If the user inputs a command to restart data communication after the wireless communication terminal returns to a communicable state, the wireless communication terminal retransmits the SYN packet to the server using the same communication port number as before. However, since a TCP connection using the above communication port number is already established on the server side, the TCP connection state on the wireless communication terminal side does not match that on the server side. In this case, the server determines that there is an error in the communication port number on the wireless communication terminal side, and transmits a reset (RST) packet to the wireless communication terminal.

When the wireless communication terminal receives the PST packet, it disconnects the TCP connection and then disconnects the PPP connection. After disconnecting the PPP, the wireless communication terminal displays an error message on a self-contained display unit such as a liquid crystal panel, thereby notifying the user that a communication connection error with the server has occurred. The user confirms the error message and determines whether to reconnect. If the user inputs a command to reconnect, the wireless communication terminal restarts the PPP connection process.

Thus when the server transmits an RST packet during the TCP connection process, the wireless communication terminal requires an extremely long time to reconnect since it is performing a series of processes that includes disconnecting the TCP, disconnecting the PPP, displaying an error to the user, and restarting the PPP connection if the user issues a reconnection command.

In contrast for example, Patent Document 1 (Japanese Unexamined Patent Application, First Publication No. 2000-148619) discloses a technique applied in a data receiver which performs data communication via a wired LAN with a file transfer protocol (FTP) server connected to a network, in which, when the power of the data receiver is turned OFF while it is performing data communication with the FTP server and then turned ON again, the time taken in establishing communication connection with the FTP server is shortened.

When the power of the data receiver is turned OFF during data communication with the FTP server, the FTP server treats this as an error in the communication port number on the data receiver side. Consequently, when the data receiver performs a process of establishing communication connection with the FTP server after the power is turned ON again, since it is conventional to use the same communication port number as that used in the previous communication, the FTP server determines that there is an error in the communication port number on the data receiver side, and transmits an error message to the data receiver. When the data receiver receives the error message, it must set a new communication port number and restart a process of establishing communication connection with the FTP server. Consequently, it takes a long time to reconnect.

According to Patent Document 1, when the data receiver establishes communication connection with the FTP server after the power is turned ON again, it uses a different communication port number to that used in the previous communication. This prevents the communication port number on the data receiver side from being treated as an error by the FTP server, and enables a communication connection to be established speedily without interrupting the establishment process.

Patent Document 1 is admittedly effective when the power of the data receiver is turned ON/OFF during data communication by wired connection. However, in the abovementioned data communication between a server connected to a network and a wireless communication terminal, the server's determination of the communication port number on the wireless communication terminal side as an error or not keeps changing according to the wireless communication status (non-communicable or communicable) (Patent Document 1 focuses solely on error messages transmitted from the FTP server when the power is turned ON again). Therefore, Patent Document 1 cannot be applied in wireless data communication with a server.

Furthermore, when the server determines that there is an error in the communication port number on the wireless communication terminal side as described above, the wireless communication terminal requires a longer time to reconnect than in wired data communication since it performs the series of processes that includes disconnecting the TCP, disconnecting the PPP, displaying the error to the user, and restarting the PPP connection if the user issues a reconnection command. There is also a considerable load on the user, since he must determine whether to reconnect to the server and input a command indicating his decision.

SUMMARY OF THE INVENTION

The present invention has been realized in consideration of the above problems, and has the following objectives.

When using wireless communication to perform data communication with a server connected to a network:

(1) To reduce the load placed on the user by a reconnection process when the wireless communication terminal receives a communication connection error from the server; and (2) To reduce the time required by the reconnection process when the wireless communication terminal receives a communication connection error from the server.

In order to achieve these objectives, a first solving means for the wireless communication terminal of the invention provides a wireless communication terminal including a function of performing data communication with a server connected to a network, having a communication controller which selects a predetermined port number from among a plurality of port numbers allocated for data communication with the server as a communication port number, and using this communication port number to perform data communication with the server, and a storage unit which stores the communication port number. While performing a process to establish a communication connection with the server, if the communication controller receives information indicating that communication connection is impossible from the server, the communication controller selects a port number which is different from the communication port number stored in the storage unit as a new communication port number, and performs the process again.

According to a second solving means for the wireless communication terminal of the invention, in the first solving means, when the communication controller transmits a synchronize packet to the server in order to establish a transmission control protocol connection with the server after establishing a point to point protocol connection and receives a reset packet from the server, the communication controller selects the port number which is different from the communication port number stored in the storage unit as the new communication port number, and retransmits the synchronize packet to the server.

A first solving means for a wireless communication method of the invention provides a wireless communication method for performing data communication with a server connected to a network, having a first step of selecting a predetermined port number from among a plurality of port numbers allocated for data communication with the server as a communication port number, a second step of using this communication port number to perform data communication, and a third step of storing the communication port number. In the second step, while performing a process to establish a connection for data communication, if information indicating that communication connection is impossible is received, a port number which is different from the communication port number stored in the third step is selected as a new communication port number, and the process is performed again.

According to a second solving means for the wireless communication method of the invention, in the first solving means, when a synchronize packet is transmitted to the server in order to establish a transmission control protocol connection with the server after establishing a point to point protocol connection and a reset packet is received from the server, the port number which is different from the communication port number stored in the third step is selected as the new communication port number, and the synchronize packet is retransmitted to the server.

According to the invention, when performing wireless data communication with a server connected to a network, the load placed on the user in performing a reconnection process when the wireless communication terminal receives a communication connection error from the server can be reduced, and the time required to perform the reconnection process can be shortened.

BRIEF DESCRIPTION OF THE DRAWINGS

FIG. 1 is a configuration block diagram of a wireless communication terminal A in an embodiment of the invention; and FIG. 2 is a flowchart of an operation of a wireless communication terminal A in an embodiment of the invention.

DETAILED DESCRIPTION OF THE INVENTION

An embodiment of the invention will be explained with reference to the drawings. FIG. 1 is a configuration block diagram of a wireless communication terminal according to an embodiment of the invention. A mobile telephone is described as an example of a wireless communication terminal. As shown in FIG. 1, a wireless communication terminal A includes a wireless communication unit 1, a key input unit 2, a display unit 3, an audio output unit 4, a camera unit 5, a communication controller 6, and a storage unit 7. In FIG. 1, reference code B represents a wireless base station, C represents a service provider server, D represents a server, and N represents a network.

In the wireless communication terminal A, the wireless communication unit 1 performs wireless communication with the wireless base station B using a predetermined communication method such as code division multiple access (CDMA), and also performs data communication with the service provider server C and the server D which are connected to the network N via the wireless base station B. The key input unit 2 includes dial keys, function keys, a power key, a special key for starting data communication, and so on, and outputs control information of these keys to the communication controller 6 as control signals.

The display unit 3 includes a liquid crystal display, an organic EL display, or the like, and displays various types of messages, telephone numbers, images, and so on, based on display signals input from the communication controller 6. The audio output unit 4 outputs audio and sound to the outside based on audio signals input from the communication controller 6. The camera unit 5 includes a charge coupled device (CCD) or the like, and outputs image signals of captured images to the communication controller 6 in compliance with commands from it.

The communication controller 6 controls the overall operation of the wireless communication terminal A based on a predetermined control program stored beforehand in the storage unit 7, control signals input from the key input unit 2, the communication state of the wireless communication unit 1, and the like. Characteristic control processes of the communication controller 6 based on the control program include selecting a predetermined port number from among a plurality of port numbers allocated for data communication with the server D as a communication port number, performing data communication with the server D using this communication port number, and storing the communication port number in the storage unit 7. During a process of establishing a TCP connection with the server D, if the communication controller 6 receives information indicating that communication connection is not possible (an RST packet) from the server D, it selects a port number which is different to the communication port number stored in the storage unit 7 as a new communication port number, and performs another TCP connection process. This TCP connection process performed by the communication controller 6 will be explained in detail later.

The storage unit 7 includes a flash memory or the like. The control program executed by the communication controller 6 is stored beforehand in the storage unit 7. The storage unit 7 also stores communication port numbers, image signals input from the camera unit 5, telephone numbers, and other data, in compliance with the communication controller 6.

A wireless base station B is installed in each predetermined service area, and functions as a relay station for connecting wireless communication terminals A in that service area to the network N by wireless communication. The service provider server C is owned by a service provider which provides an internet service to the user of the wireless communication terminal A, and appends an IP address to the wireless communication terminal A by establishing a PPP connection with it. The server D provides a variety of data to the user of the wireless communication terminal A, and performs data communication with the wireless communication terminal A by establishing a TCP connection with it.

Subsequently, an operation of the wireless communication terminal A having the above configuration (specifically, a TCP connection process executed by the communication controller 6) will be explained using the flowchart of FIG. 2.

When the user presses the special key for starting data communication, i.e. when a command to start data communication with the server D is received from the user (step S1), the communication controller 6 controls the wireless communication unit 1 such as to access the service provider server C via the wireless base station B and establish a PPP connection (step S2). The service provider server C appends an IP address to the wireless communication terminal A.

After the PPP connection is established, the communication controller 6 randomly selects a communication port number from the plurality of port numbers for data communication (numbers 1024 to 65535) allocated to itself (that is, it uses a socket which combines the IP address with the communication port number as its own network address) and controls the wireless communication unit 1 such as to transmit a synchronize (SYN) packet via the wireless base station B to the server D; in addition, the communication controller 6 stores the communication port number in the storage unit 7 (step S3).

When, for some reason, the server D determines that there is an error in the communication port number of the wireless communication terminal A (e.g. when the server D side does not permit TCP connection from the communication port number of the wireless communication terminal A, or when the user outputs a command to end the data communication after the wireless communication terminal A enters a non-communicable state during the previous data communication, and thereafter the wireless communication terminal A attempts to establish a TCP connection using the same communication port number as previously, etc.), and the communication controller 6 receives information indicating that communication connection is not possible (an RST packet) from the server D (step S4), the communication controller 6 determines whether the TCP connection state is SYN_SENT (step S5). When the communication controller 6 determines NO in step S5, i.e. that the state is not SYN_SENT, since data communication is already being performed, the communication controller 6 disconnects the TCP and PPP connections (step S13).

On the other hand, when the communication controller 6 determines YES in step S5, i.e. that the TCP connection state is SYN_SENT, the communication controller 6 randomly selects a new communication port number from the plurality of port numbers for data communication (numbers 1024 to 65535) allocated to itself (step S6), and determines whether the selected communication port number differs from the communication port number used in the previous communication which is stored in the storage unit 7 (step S7). When the communication controller 6 determines NO in step S7, i.e. that the selected communication port number is the same as the previous one, it returns to step S6 and selects a new communication port number.

On the other hand, when the communication controller 6 determines YES in step S7, i.e. that the selected communication port number is different from the previous one, it uses the newly selected communication port number (i.e. the socket of the wireless communication terminal A includes the same IP address used previously in combination with the newly selected communication port number) in controlling the wireless communication unit 1 such that the SYN packet is retransmitted via the wireless base station B to the server D (step S8).

Since the communication port number on the wireless communication terminal A side differs from the previous one, the server D does not determine that there is an error, and transmits an SYN/ACK packet to the wireless communication terminal A (step S9). When the wireless communication terminal A receives this SYN/ACK packet, it transmits an ACK packet to the server (step S10). A TCP connection is thereby established between the wireless communication terminal A and the server D (step S11), and data is communicated between them (step S12).

If, after selecting a new communication port number and attempting to reestablish a TCP connection with the server D, an RST packet is transmitted again from the server D, and an RST packet is still transmitted after repeating the processes from step S6 to step S8 for a predetermined period of time (e.g. approximately one minute), the communication controller 6 can disconnect the TCP and PPP connections, and makes the display unit 3 display an error message such as 'The server appears to have stopped. Please contact your server manager.'

As described above according to this embodiment, when an RST packet is received from the server D during a process of establishing a TCP connection with the server D, a reconnection process is performed automatically without making the user aware of this. The load on the user can thereby be reduced, since he need not perform a reconnection operation (selecting an application, setting data reception/transmission, pressing the special key for starting data communication, etc.). Furthermore, since it is not necessary to perform a series of processes that includes disconnecting the TCP, disconnecting the PPP, displaying an error to the user, and restarting the PPP connection if the user issues a reconnection command as in the prior art, the time required for reconnection can be shortened.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal including a function of performing data communication with a server connected to a network, comprising:
   a wireless communication unit which performs wireless communication;
   a communication controller which connects to the network using the wireless communication unit, establishes a point to point protocol (PPP) connection with the server, selects a predetermined port number from among a plurality of port numbers allocated for data communication with the server as a communication port number, and establishes a transmission control protocol (TCP) connection using this communication port number to perform data communication with the server; and
   a storage unit which stores the communication port number; wherein:
   the communication controller determines whether the TCP connection is in a SYN_SENT state in which the communication controller waits an acknowledgement in reply to a synchronization (SYN) packet when the communication controller receives information indicating that communication connection is impossible from the server using the communication port number during establishment of the PPP connection;
   if the communication controller determines that the TCP connection is in the SYN_SENT state, the communication controller maintains the PPP connection and selects a port number which is different from the communication port number stored in the storage unit as a new communication port number, and performs the process again to establish the TCP connection using the new communication port number; and
   if the communication controller determines that the TCP connection is not in the SYN_SENT state, the communication controller releases the TCP connection and the PPP connection.

2. The wireless communication terminal according to claim 1, wherein the information is a reset (RST) packet sent from the server and indicating an error in the TCP connection.

3. The wireless communication terminal according to claim 2, wherein the list packet indicates that the TCP connection is impossible in response to the SYN packet sent by the communication controller to the server to establish the TCP connection.

4. The wireless communication terminal according to claim 3, wherein the communication controller determines whether the state of the TCP connection is in the SYN_SENT state upon receipt of the list packet in response to the SYN packet sent to the server.

5. The wireless communication terminal according to claim 4, wherein, when the communication controller receives the list packet after sending the SYN packet using the new communication port number, the communication controller selects a new port number which is different from the port number which was previously selected and sends the SYN packet using the new selected port number.

6. The wireless communication terminal according to claim 5, further comprising:
   a display unit which displays an error message when the communication controller receives the RST packets in response to the SYN packets repeatedly sent in predetermined times by the communication controller using the new selected port number.

7. The wireless communication terminal according to claim 5, wherein, when the state of the TCP connection is in the SYN_SENT state, the communication controller selects a new port number at random.

8. A wireless communication method for performing data communication with a server connected to a network, comprising:
   a first step of connecting the network by wireless communication, establishing a point to point protocol (PPP) connection with the server and selecting a predetermined port number from among a plurality of port numbers allocated for data communication with the server as a communication port number;
   a second step of establishing a transmission control protocol (TCP) connection with the server using the communication port number to perform data communication with the server;
   a third step of storing the communication port number;
   a fourth step of determining whether the TCP connection is in a SYN_SENT state in which the communication controller waits an acknowledgement in reply to a synchronization (SYN) packet when the communication controller receives a connection error signal from the server during establishment of the PPP connection;
   a fifth step of maintaining the PPP connection and selects a port number which is different from the communication port number stored in the storage unit as a new communication port number, and performs the process again to establish the TCP connection using the new communication port number if the TCP connection is determined to be in the SYN_SENT state in the fourth step; and
   a sixth step of releasing the TCP connection and the PPP connection if the TCP connection is determined not to be in the SYN_SENT state in the fourth step.

9. The wireless communication method according to claim 8, wherein the connection error signal is a reset (RST) packet sent from the server and indicating an error in the TCP connection.

10. The wireless communication method according to claim 9, wherein the RST packet indicates that the TCP connection is impossible in response to the SYN packet sent by the communication controller to the server to establish the TCP connection.

11. The wireless communication method according to claim 10, wherein the fourth step is performed upon receipt of the RST packet in response to the SYN packet sent to the server in the second step.

12. The wireless communication method according to claim 11, wherein, when the fifth step is performed after the TCP connection is determined to be in the SYN_SENT state in the fourth step, the fifth step is further performed if the RST packet is further received.

13. The wireless communication method according to claim 12, further comprising:
   a seventh step of displaying an error message if the RST packets are continuously received after repeatedly performing the fifth step in predetermined times.

14. The wireless communication method according to claim 12, wherein the new communication port number is selected at random in the fifth step.

* * * * *